US 6,554,996 B1

(12) United States Patent
Rebori

(10) Patent No.: US 6,554,996 B1
(45) Date of Patent: Apr. 29, 2003

(54) WASTEWATER TREATMENT SYSTEM

(75) Inventor: Robert J. Rebori, Shawnee, KS (US)

(73) Assignee: Bio-Microbics, Inc., Shawnee, KS (US)

(*) Notice: Subject to any disclaimer, the term of this patent is extended or adjusted under 35 U.S.C. 154(b) by 56 days.

(21) Appl. No.: 09/972,300

(22) Filed: Oct. 5, 2001

(51) Int. Cl.⁷ .............................. C02F 3/06; C02F 3/30
(52) U.S. Cl. ...................... 210/151; 210/196; 210/232; 210/256; 210/532.2
(58) Field of Search ................. 210/150, 151, 210/194, 195.3, 196, 197, 232, 256, 532.2

(56) References Cited

U.S. PATENT DOCUMENTS

| | | | |
|---|---|---|---|
| 2,857,054 A | | 10/1958 | Sitton |
| 3,126,333 A | * | 3/1964 | Williams .................... 210/151 |
| 3,339,743 A | | 9/1967 | Bealle |
| 3,494,463 A | * | 2/1970 | Vermette .................... 210/151 |
| 3,774,768 A | | 11/1973 | Turner |
| 3,923,605 A | | 12/1975 | Gedde |
| 3,966,599 A | | 6/1976 | Burkhead |
| 3,966,608 A | | 6/1976 | Mason et al. |
| 3,972,965 A | | 8/1976 | Higgins |
| 4,882,046 A | | 11/1989 | Waite |
| 4,933,076 A | * | 6/1990 | Oshima et al. ............. 210/151 |
| 5,156,742 A | * | 10/1992 | Struewing .................... 210/151 |
| 5,162,083 A | | 11/1992 | Forbes et al. |
| 5,202,027 A | * | 4/1993 | Stuth ............................. 210/151 |
| 5,437,786 A | | 8/1995 | Horsley |
| 5,441,632 A | | 8/1995 | Charon |
| 5,484,524 A | * | 1/1996 | MacLaren et al. ......... 210/151 |
| 5,609,754 A | * | 3/1997 | Stuth ............................. 210/256 |
| 5,620,602 A | * | 4/1997 | Stuth ............................. 210/151 |
| 5,632,906 A | | 5/1997 | Ishida et al. |
| 5,762,784 A | * | 6/1998 | Jowett .......................... 210/150 |

* cited by examiner

Primary Examiner—Christopher Upton
(74) Attorney, Agent, or Firm—Wood, Philips, Katz, Clark & Mortimer

(57) ABSTRACT

An apparatus for converting a typical anaerobic septic tank system into an efficient aerobic treatment system for treatment of liquor containing biodegradable wastes. The apparatus includes a collapsible reactor module that can pass through a relatively small opening in a septic tank cover. The reactor module contains media through which liquor to be treated is recirculated and aerated.

9 Claims, 3 Drawing Sheets

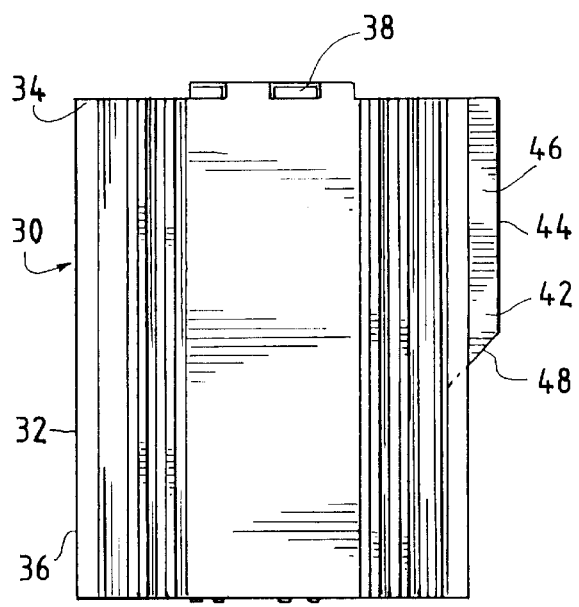
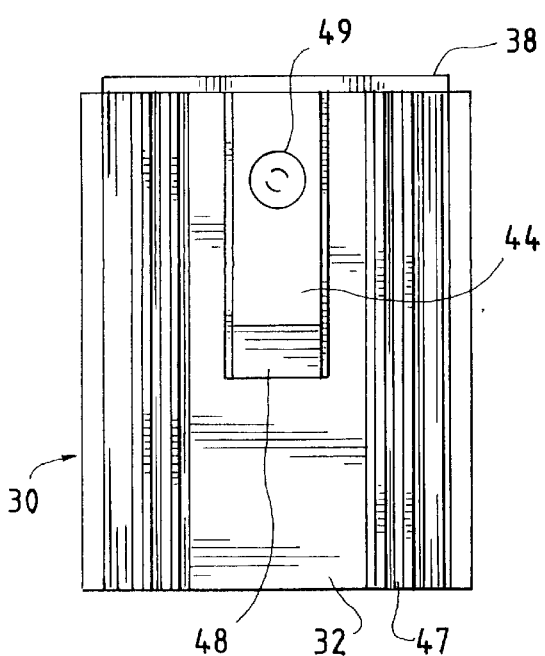
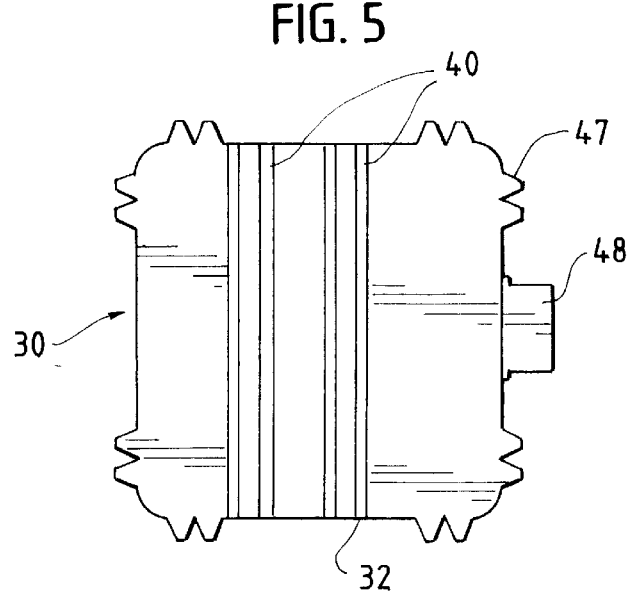

WASTEWATER TREATMENT SYSTEM

FIELD OF THE INVENTION

The present invention relates generally to the treatment of biodegradable waste products and, more particularly, to a wastewater treatment system utilizing aerobic microbial growth on fixed media for biological oxidation of waste products that can be retrofitted into existing septic tanks.

BACKGROUND OF THE INVENTION

At the present time, many single-family homes and small multi-family homes that are not connected to a central sewer system employ a septic tank system for the disposal of biodegradable wastes, particularly sewage. These tanks are generally of very low efficiency in processing these wastes, and, as a result, often tend to pollute the environment. Accordingly, there is a need for a high-efficiency system for the treatment of biodegradable waste products which can be used in conjunction with, and to upgrade, existing septic tank systems.

There have been many systems introduced to address the above-discussed problems associated with conventional anaerobic septic tank systems. The most commonly used systems replace the septic system with an aerobic wastewater treatment system. Examples of such systems are disclosed in U.S. Pat. Nos. 3,966,599, 3,966,608 and 3,972,965, which patents are assigned to the same assignee as the present invention, and the disclosures of which are incorporated herein by reference. These systems generally comprise a settling tank having an inlet communicating with an upper portion thereof and a reactor chamber having an inlet communicating with the settling tank. A column of fixed high surface area-to-volume ratio media is disposed within the reactor chamber. Aeration means are provided in the reactor chamber for introducing air into the liquor containing biodegradable wastes and means for delivering and recirculating the liquor through the fixed media. The treated effluent liquor is withdrawn from the reactor chamber. The replacement of septic tank systems with these high efficiency aerobic wastewater treatment systems has solved most of the environmental problems associated with septic tank systems.

However, these aerobic wastewater treatment systems, when used to replace or supplement an existing septic tank system, typically require the use of excavation equipment and hoisting systems, which is costly and causes damage to a yard. This problem is recognized in U.S. Pat. No. 5,162,083, wherein an apparatus is disclosed for converting a standard anaerobic septic tank system into an aerobic wastewater treatment system. The apparatus contemplates the removal and modification or replacement of the septic tank lid. An air diffuser assembly and a clarifier insert are positioned within the septic tank. The clarifier insert is disclosed as being made from fiberglass or A-36 carbon steel. The clarifier insert does not contain media. The installation of the apparatus requires the removal of the earth above lid and the removal of the lid in order to install the component parts of the apparatus in the septic tank.

There is a need for a high efficiency aerobic wastewater treatment system that can be installed through the relatively small opening in the top of an existing septic tank and which contains media through which the waste liquor is recirculated.

SUMMARY OF THE INVENTION

In accordance with the present invention, an apparatus is provided for converting a typical anaerobic septic tank system into an efficient aerobic. treatment system for treatment of liquor containing biodegradable wastes. The invention includes a collapsible reactor module that is capable of being folded to pass through the opening in the cover of a septic tank and unfolded to provide a reactor chamber supported within the septic tank. The corner sections of the reactor module are corrugated to facilitate the folding and unfolding thereof. The reactor chamber is supported from the cover of the septic tank by a plurality of strips that are secured to the cover of the septic tank.

A draft tube extends centrally through the reactor module through which liquor to the treated is recirculated. Media is positioned within the reactor module in surrounding relationship with the draft tube through which the liquor recirculates.

An aerator assists in the recirculation of the liquor and introduces air into the recirculating liquor. The aerator may include an air line extending through the draft tube such that an open end is located adjacent a lower portion of the reactor module and the other end is in communication with a blower device located outside of the septic tank.

The instant invention and the operation thereof will now be described with particular reference to the accompanying drawings which form a part of this specification wherein like reference characters designate the corresponding parts in the several views.

BRIEF DESCRIPTION OF THE DRAWINGS

FIG. 3 is a front elevational view of a reactor module in accordance with a preferred embodiment of the invention;

FIG. 4 is a side elevational view of the reactor module as shown in FIG. 3;

FIG. 5 is bottom plan view of the reactor module as shown in FIG. 3; and

DETAILED DESCRIPTION OF A PREFERRED EMBODIMENT

Figure 1:
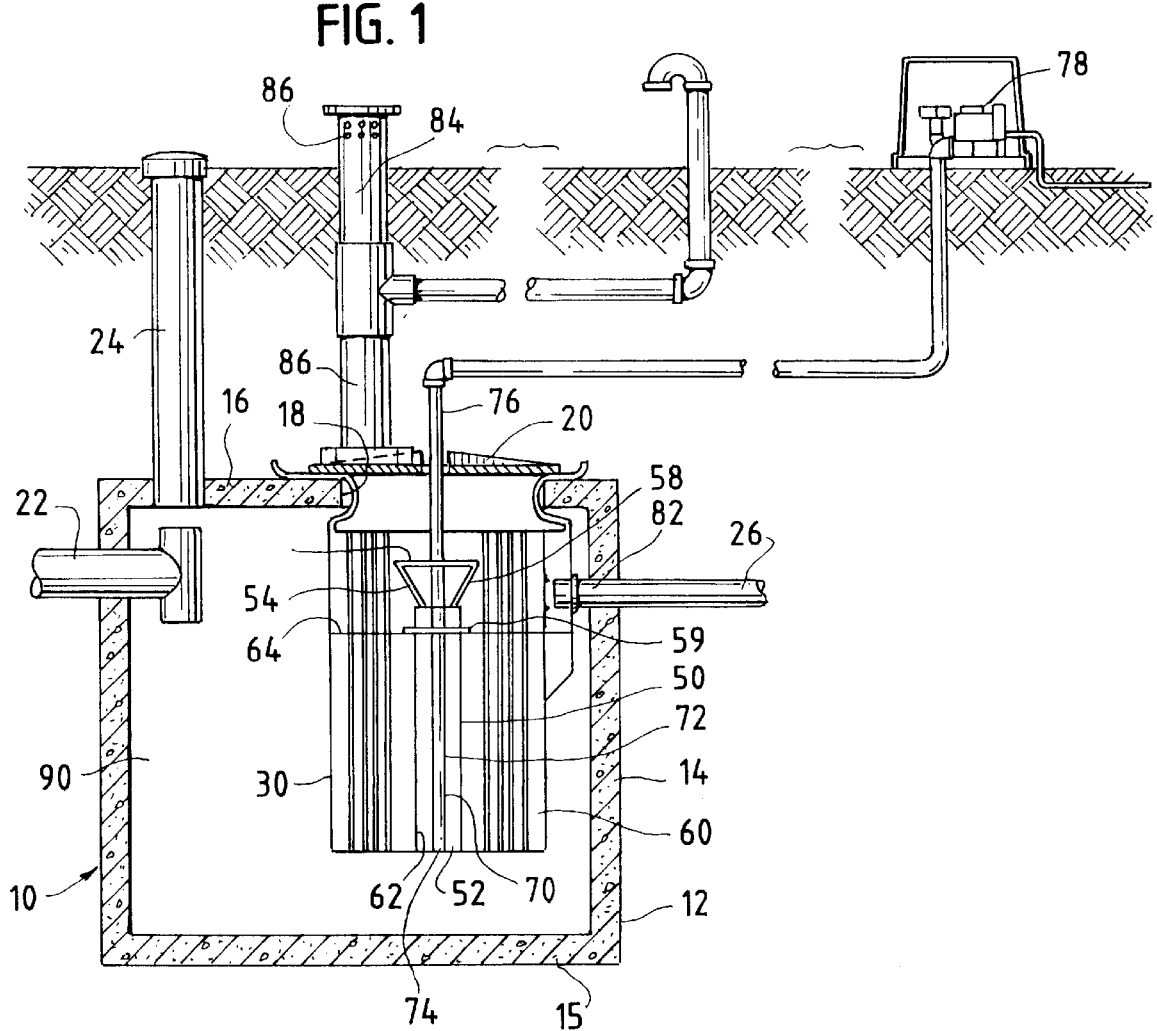
FIG. 1 is a vertical sectional view of a septic tank which has been converted to an efficient aerobic treatment system that includes a reactor module in accordance with a preferred embodiment of the invention.
Figure 2:
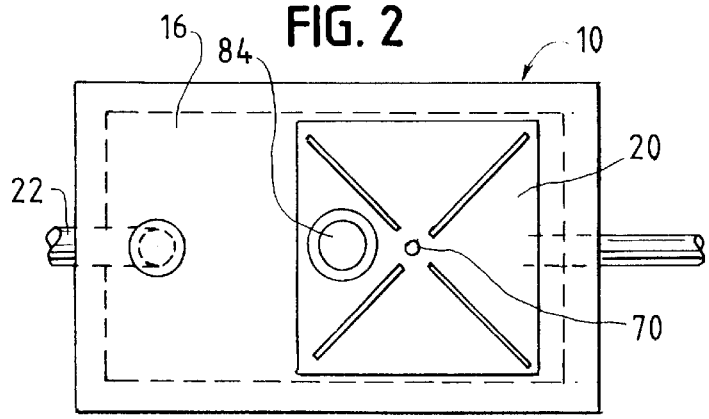
FIG. 2 is a top plan view of the septic tank as shown in FIG. 1.

Referring to FIG. 1, there is shown a sectional view of an anaerobic septic tank system that is been converted to an efficient aerobic treatment system in accordance with a preferred embodiment of the invention.

A traditional septic tank is identified by the reference numeral 10 and includes a septic tank 12 having sidewalls 14, a bottom wall 15, and a top wall 16.

The top wall 16 has a man hole 18, which has a removable cover 20 in closing relationship thereto. The cover 20 may be the existing cover or a replacement cover that is used in connection with the conversion operation. An influent pipe 22 extends through an upper portion of a side wall of the septic tank and an inspection pipe 24 extends through the top wall. An effluent pipe 26 extends through an opposing side wall of the septic tank.

In accordance with the inventor, the anaerobic septic tank system 10 is converted to an efficient aerobic treatment system by locating a fixed activated sludge treatment reactor module 30 within the septic tank 12. In order to do so, it is necessary to pass the reactor module 30 through a man hole opening 18 that may be as small as twelve inches in diameter. The reactor module 30 in accordance with a preferred embodiment of the invention is designed so that it may be folded to pass through opening 18 and to subsequently unfold within the septic tank.

Figure 6:
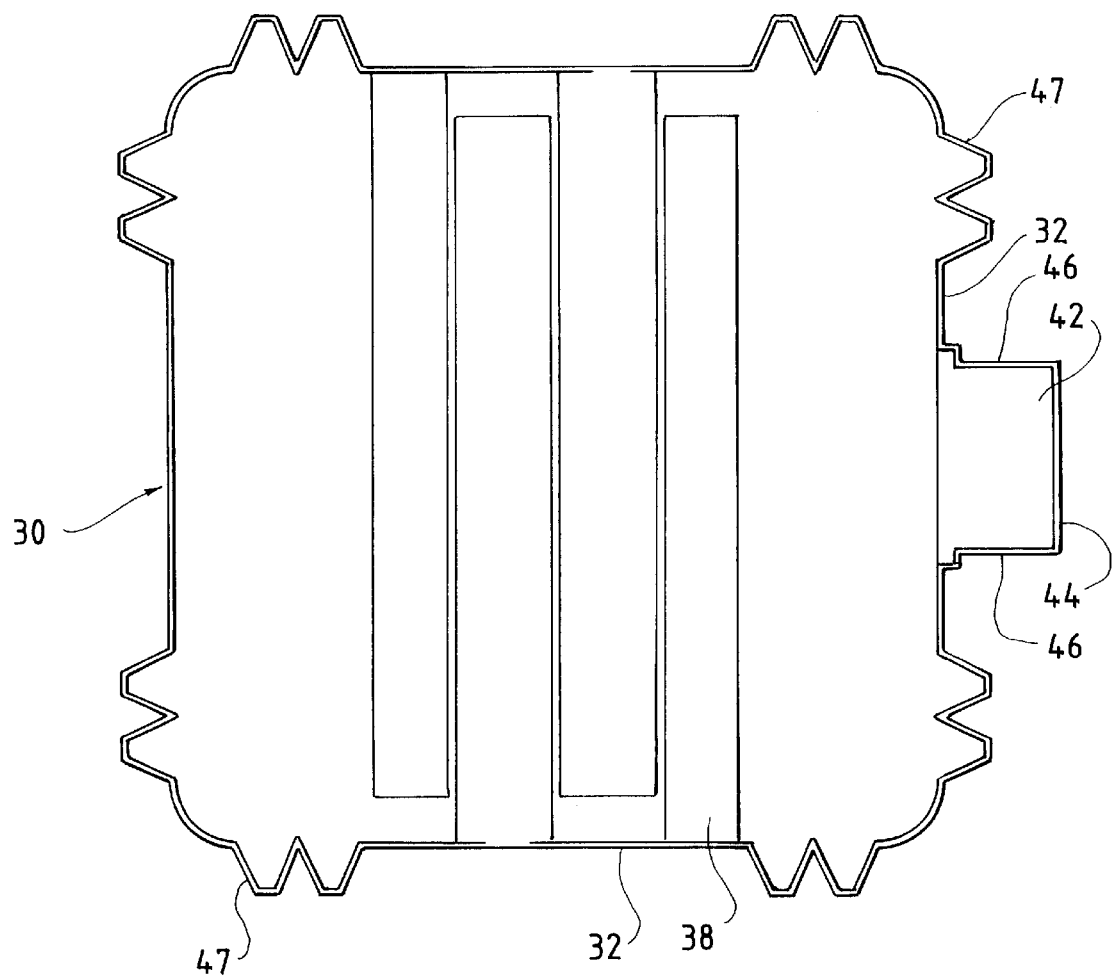
FIG. 6 is an enlarged top plan view of the reactor module as shown in FIG. 3.

Referring to FIGS. 3–6, reactor module 30 is generally rectangular in shape and includes side walls 32 having upper edge portions 34 and lower edge portions 36. The upper and lower ends of reactor module 30 are generally open, except to the extent discussed herebelow. A pair of spaced apart, flexible, support strips 38 extend from each of two opposing upper edge portions 34, as best seen in FIG. 6. The support strips may be integrally molded with the upper portions of the side walls of the reactor module. A plurality of spaced apart support strips 40 extend from each of two opposing lower edge portions 36, as best seen in FIG. 5. The support strips 40 may be integrally molded with the lower edge portions of the side walls of the reactor module. An effluent chamber 42 extends outwardly from an upper portion of one of the side walls of the reactor module. Effluent chamber 42 may be integrally formed with the side wall. Effluent chamber 42 includes an end wall 44, side walls 46 and an inclined bottom wall 48. An effluent opening 49 extends through an upper portion of end wall 44.

In accordance with a preferred embodiment of the invention, reactor module 30 may be formed from a low linear polyethylene plastic of various flex module, or similar material, having a thickness of about 0.120 to 0.200 inches so that the module may be folded during assembly and unfolded during use. The corner portions 47 of reactor module 30 are preferably formed with corrugations to further facilitate the folding and unfolding of the reactor module.

Referring to FIG. 1, septic tank system 10 includes a draft tube 50 that extends through reactor module 30. Draft tube 50 includes an open lower end portion 52, that terminates adjacent the lower end portion 36 of reactor module 30, and an upper end portion 54 that terminates adjacent the upper end portion 34 of reactor module 30. Upper end portion 54 includes a splash plate 56 and open side portions 58 through which recirculating liquor may pass through. A support ring 59 extends from the outer surface of draft tube 50 for supporting the draft tube from the media 60.

The media 60 is supported within reactor module 30 by the support strips 40. The media 60 may take many different forms. In accordance with a preferred embodiment, the media takes the form of a plurality of media blocks that are configured to fit together to form a media block having a central opening 62 through which the draft tube 50 may extend. The media defines an upper surface 64 from which the support ring 59 supports the draft tube 50 within the reaction module 30.

As is known in the art, media 60 may be any suitable material having a high ratio of void space to volume. The media 60 should also have a surface which is receptive to aerobic microbial growth. By way of example, plastic packing media made from polyethylene, exemplary of such a material is Bio-Net Trickling Filter Media, as manufactured by NSW Corporation. Alternatively, media 60 may be loose fill that, such as Bio-Pac SF #30 as manufactured by NSW Corporation, that is supported in foraminous enclosures.

An aerator 70 is provided to introduce oxygen into the recirculating liquor. In accordance with a preferred embodiment, aerator 70 includes an air line 72 extending through draft tube 50. Air line 72 includes an open first end 74 located substantially at the same elevation as the lower end of the draft tube and a second end 76 that extends through the cover and is in communication with a suitable blower device 78, of well known construction. Alternatively, other types of aerators may be used, such as a mechanical surface aerator.

Effluent pipe 26 has a first end 82 suitably connected to effluent chamber 42 in communication therewith through opening 49. A suitable vent pipe 84 may be provided that has a first end 86 that extends into septic module 30 and a second end 88 in communication with the atmosphere.

In operation, referring to FIG. 1, a liquor containing biodegradable wastes, generally in both dissolved and undissolved forms, is delivered to the septic tank 12 through the inlet pipe 22. The liquid passes into a settling and anaerobic digestion area 90, which is relatively quiescent due to the low flow rates and lack of agitation. Floatable materials are degraded on the surface of the settling and anaerobic digestion area 90 after degradation, and any remaining solids settle to the bottom of septic tank 12. A large portion of the particulate matter contained in the liquor settles to the bottom of the tank 12, where it is digested by the anaerobic bacteria which exists within the biodegradable material.

The liquor passes from the settling and anaerobic digestion area into the reactor module 30 through the open lower portion thereof. The liquor then passes upwardly through the draft tube 50. This upward movement is produced by the upwardly rising stream of air bubbles introduced through the air line 72.

After the liquor reaches the top of the draft tube 50, it is distributed in a relatively even manner over the top of the media 60. The liquor passes downwardly through the media 60 where it is aerobically digested by the microorganisms on the surface thereof. Any solids that are released from the media 60 pass downwardly into the settling and anaerobic digestion area 90, where they may be periodically collected.

After the liquor has made a pass through the media 60, it again passes upwardly through the draft tube 50, and is recirculated through the media. This recirculation occurs a number of times before the liquor is withdrawn from the septic tank 12 through the effluent pipe 26.

Obviously, many modifications and variations of the invention as hereinafter set forth will occur to those skilled in the art, and it is intended to cover in the appended claims all such modifications and variations as fall within the true spirit and scope of the invention.

What is claimed is:

1. An apparatus for converting typical anaerobic septic tank system into an efficient aerobic treatment system for treating liquor containing biodegradable wastes, said septic tank system including a septic tank having a cover, comprising:
   (a) a collapsible reactor module positioned in the septic tank, said reactor module having collapsible side walls to permit the reactor insert to fold and pass through an opening in the cover and to unfold upon entry into said septic tank; said reactor module having substantially open upper and lower ends;
   (b) a draft tube extending through said module reactor;
   (c) fixed media positioned within said reactor module; in surrounding relationship with said draft tube, through which the liquor recirculates;
   (d) an aerator for introducing oxygen into the recirculating liquor in the reactor module; and
   (e) an effluent pipe having a first end in communication with an upper portion of said reactor module through an opening in the side wall of said reactor module and a second end in communication with an effluent pipe associated with the septic tank.

2. The invention as defined in claim 1 wherein said reactor module is substantially rectangular in cross-section and has corner positions that are corrugated to facilitate the folding and unfolded thereof.

3. The invention as defined in claim 1 wherein said reactor module includes a plurality of strap portions extending from upper edge portions thereof for supporting said reactor module within the septic tank from the cover of the septic tank.

4. The invention as defined in claim 3 wherein said strap portions extend through the opening in the cover and are secured to an outer surface of the cover.

5. The invention as defined in claim 1 wherein said reactor module included a plurality of spaced apart support strips extend between opposing lower edge portions thereof for support of said fixed media thereabove.

6. The invention as defined in claim 1 wherein said draft tube includes a support ring which is in contact with an upper surface of the fixed media for supporting said draft tube in said reactor module.

7. The invention as defined in claim 1 wherein said reactor module includes an effluent chamber extending outwardly from an upper portion of the side wall of the reactor module, said first end of said effluent pipe extending into said effluent chamber.

8. The invention as defined in claim 1 wherein said aerator includes an air line extending through said draft tube, said air line having a first end located substantially at the same elevation as the lower end of said draft tube and a second end in communication with a blower device located outside of the septic tank.

9. The invention as defined in claim 1 further including a vent pipe that has a first end in communication with the septic tank and a second end in communication with the atmosphere.

* * * * *